US007569166B2

(12) United States Patent
Ichitani et al.

(10) Patent No.: US 7,569,166 B2
(45) Date of Patent: Aug. 4, 2009

(54) BINDER RESIN FOR COATING PASTE

(75) Inventors: Motokuni Ichitani, Koka-gun (JP); Daizo Ii, Mishima-gun (JP); Yukio Ochitani, Koka-gun (JP); Hideyuki Takahashi, Mishima-gun (JP); Katsuaki Sakashita, Koka-gun (JP)

(73) Assignee: Sekisui Chemical Co., Ltd., Osaka-shi (JP)

( * ) Notice: Subject to any disclaimer, the term of this patent is extended or adjusted under 35 U.S.C. 154(b) by 329 days.

(21) Appl. No.: 10/561,971

(22) PCT Filed: Jun. 28, 2004

(86) PCT No.: PCT/JP2004/009127

§ 371 (c)(1), (2), (4) Date: Apr. 19, 2006

(87) PCT Pub. No.: WO2005/007710

PCT Pub. Date: Jan. 27, 2005

(65) Prior Publication Data

US 2006/0192180 A1    Aug. 31, 2006

(30) Foreign Application Priority Data

| Jun. 26, 2003 | (JP) | ............................. 2003-183187 |
| Sep. 19, 2003 | (JP) | ............................. 2003-328162 |
| Sep. 19, 2003 | (JP) | ............................. 2003-328163 |
| Mar. 18, 2004 | (JP) | ............................. 2004-079082 |
| Mar. 18, 2004 | (JP) | ............................. 2004-079083 |
| Apr. 12, 2004 | (JP) | ............................. 2004-117062 |

(51) Int. Cl.
- *H01B 1/20* (2006.01)
- *H01B 1/12* (2006.01)
- *C08F 8/00* (2006.01)
- *C08L 63/00* (2006.01)

(52) U.S. Cl. .............................. 252/519.33; 252/518.1; 252/519.32; 525/61; 525/525; 525/454

(58) Field of Classification Search ............... 252/518.1, 252/519.32, 519.33; 525/61, 525, 454
See application file for complete search history.

(56) References Cited

U.S. PATENT DOCUMENTS

| 6,555,617 | B1* | 4/2003 | Tanaka et al. .................... 525/61 |
| 6,737,474 | B2* | 5/2004 | Tanaka et al. .................... 525/61 |
| 6,924,334 | B1* | 8/2005 | Fukatani et al. ................. 524/445 |
| 6,992,130 | B2 | 1/2006 | Kusudou et al. |
| 7,232,648 | B2* | 6/2007 | Takahashi et al. ............. 430/287.1 |
| 7,267,929 | B2* | 9/2007 | Takahashi et al. .............. 430/311 |
| 7,312,013 | B2* | 12/2007 | Takahashi et al. ............ 430/270.1 |
| 7,498,391 | B2* | 3/2009 | Hashemzadeh et al. ........ 526/217 |
| 2001/0010617 | A1 | 8/2001 | Miyazaki et al. |
| 2004/0260020 | A1 | 12/2004 | Miyake et al. |
| 2005/0245694 | A1* | 11/2005 | Matsumura et al. ........... 525/437 |
| 2005/0260404 | A1* | 11/2005 | Iwade et al. ................... 428/325 |

FOREIGN PATENT DOCUMENTS

| CN | 1495205 | 5/2004 |
| EP | 1 384 731 A1 | 1/2004 |
| JP | HEI-3-035762 | 3/1985 |
| JP | HEI-4-049766 | 6/1986 |
| JP | 63-79741 A | 4/1988 |

(Continued)

OTHER PUBLICATIONS

Krapczyk, Jerome, "Vinyl Acetal Polymers", Kirk-Othmer Encyclopedia of Chemical Technology, Dec. 2000, pp. 1-17.*

*Primary Examiner*—Douglas Mc Ginty
(74) *Attorney, Agent, or Firm*—Connolly Bove Lodge & Hutz LLP

(57) ABSTRACT

It is the object of the present invention to provide a binder resin for coating paste, comprising a polyvinyl acetal type resin, having an excellent dispersibility of inorganic powder such as conductive powder, ceramic powder and glass powder and being capable of exerting an extremely excellent coating property, particularly a printing property, when dispersing the inorganic powder to form paste, conductive paste, ceramic paste and glass paste.

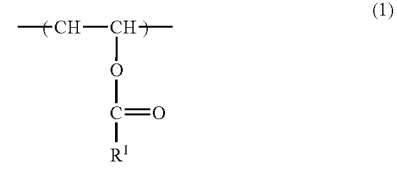

(1)

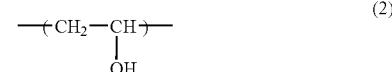

(2)

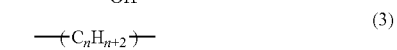

(3)

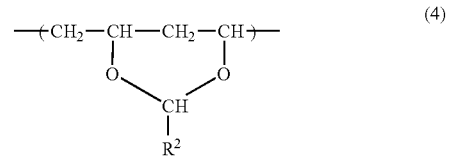

(4)

in the formulas, $R^1$ represents a straight chain or branched alkyl group having 1 to 20 carbon atoms, and $R^2$ represents hydrogen, a straight chain, branched or cyclic alkyl group having 1 to 20 carbon atoms, or an aryl group; and n represents an integer of 1 to 8; and further in the modified polyvinyl acetal resin, a content of the structural unit represented by the general formula (3) is 1 to 20 mol % and a content of the structural unit represented by the general formula (4) is 30 to 78 mol %.

3 Claims, No Drawings

FOREIGN PATENT DOCUMENTS

| | | |
|---|---|---|
| JP | 63-79752 A | 4/1988 |
| JP | SHO-63-079741 | 4/1988 |
| JP | SHO-63-079752 | 4/1988 |
| JP | 4-139267 | 5/1992 |
| JP | 7-316474 | 12/1995 |
| JP | HEI-8-222135 | 8/1996 |
| JP | 2001-237140 | 8/2001 |
| JP | 2002-063849 | 2/2002 |
| JP | 2002-280250 | 9/2002 |
| JP | 2002-283669 A | 10/2002 |
| JP | 2002-283699 | 10/2002 |
| JP | 2003-281935 | 10/2003 |
| JP | 2004-068013 | 3/2004 |
| JP | 2004-68013 A | 3/2004 |
| JP | 4146823 | 10/2005 |
| WO | WO 03/028143 A1 | 4/2003 |

* cited by examiner

BINDER RESIN FOR COATING PASTE

TECHNICAL FIELD

The present invention relates to a binder resin for coating paste, comprising a polyvinyl acetal type resin, having an excellent dispersibility of inorganic powder such as conductive powder, ceramic powder and glass powder and being capable of exerting an extremely excellent coating property, particularly a printing property, when dispersing the inorganic powder to form paste, conductive paste, ceramic paste and glass paste.

BACKGROUND ART

In recent years, there are applied in various field methods of preparing precise conductive films, ceramic films and glass films by coating paste obtainable by dispersing inorganic powder such as conductive powder, ceramic powder and glass powder in a binder resin and then burning the coated paste after a debinder step.

Laminate type electronic devices such as a laminated ceramic condenser are generally produced by following the steps as follows (for example, as described in Patent Document No. 1 and Patent Document No. 2).

First, to a solution obtainable by dissolving a binder resin such as a polyvinyl butyral resin and a poly(meth)acrylic ester resin in an organic solvent, a plasticizer and a dispersant are added, and then to this, ceramic raw material powder was added and the resulting mixture is mixed homogeneously with a ball mill and the like and defoamed to obtain a ceramic slurry composition having a certain viscosity. The obtained slurry composition is applied by casting onto the surface of a supporting member such as a polyethylene terephthalate film or SUS plate subjected to releasing treatment using a doctor blade, a reverse roll coater, etc. The applied slurry composition is heated to evaporate volatile components such as the solvent, and then a dried slurry composition is peeled off from the supporting member to obtain a ceramic green sheet.

Next, a plurality of processed sheets, which is formed by applying conductive paste formed by dispersing metal powder such as palladium and nickel in a binder resin and a solvent onto the obtained ceramic green sheet by screen printing and the like, are alternately overlaid, and the respective layers of this overlaid substance are thermally attached to another by pressure to obtain a laminate. After performing the treatment in which binder components contained in this laminate are removed by thermal decomposition, so-called degreasing treatment, the laminate was burnt out, and the resulting ceramic burnt body goes through the step of burning an external electrode on the end face of the resulting ceramic burnt body to obtain a laminated ceramic condenser.

And, in the case where laminated ceramic condensers are produced by such a method, when a ceramic green sheet coated with conductive paste is laminated, a level difference is generated between areas coated with conductive paste and areas not coated with conductive paste. In recent years, laminated ceramic condensers are required to have higher capacity and it is studied to further increase the number of layers and to reduce a film thickness. In the laminated ceramic condensers in which the number of layers is extremely increased and a film thickness is extremely reduced like this, there is a tendency that the level difference due to the presence or absence of coating the conductive paste is accumulated, and this causes peeling (delamination) between the ceramic green sheet and a conductive layer in pressing the laminate or deformation of a dielectric layer or a conductive layer at the end of the laminated ceramic condenser.

On the other hand, in Patent Document No. 3, there is described a method of preventing the occurrence of level difference by screen printing the conductive paste on the ceramic green sheet and then applying ceramic paste to an area on the ceramic green sheet, to which the conductive paste was not applied, by a method such as screen printing.

And, for example when plasma display panels are produced, they are generally produced by following the steps as follows. First, a display electrode and a bus electrode are formed on a glass substrate. By further forming a dielectric layer and a MgO layer on the glass substrate, a front glass substrate is prepared. On the other hand, by forming a data electrode, forming a dielectric layer and further forming barrier ribs and a fluorescent material layer on a glass substrate, a back glass substrate is prepared. These front glass substrate and back glass substrate are stuck to each other, air is exhausted, a discharge gas is filled and then a printed circuit board is implemented to complete the plasma display panel.

The barrier ribs are formed as follows in the steps of producing the back glass substrate (for example, as described in Patent Document No. 4 and Patent Document No. 5). A barrier rib material is applied to a glass substrate and a dry film resist is laminated. This laminated substrate is exposed through a photomask and developed to form a pattern. Then, the barrier rib material is cut in pattern form by sandblasting, and after a residual dry film resist is peeled, a pattern is subjected to burning. In this time, as a barrier rib material, there is used glass paste formed by dispersing a glass powder in a binder resin and a solvent.

As a binder resin for supporting such inorganic powders such as conductive powder, ceramic powder and glass powder, conventionally, ethyl cellulose resins have been mainly employed. Paste, in which ethyl cellulose is used as a binder resin, is superior in a coating property, and since particularly a coating method such as screen printing can be employed, coats having a precise form can be easily formed. However, ethyl cellulose had several significant problems.

For example, when ethyl cellulose is employed as a binder resin of conductive paste or ceramic paste for producing a laminated ceramic condenser, since it has low adhesive property to a ceramic green sheet in which a polyvinyl acetal resin is used as a binder resin, peeling between layers, so-called delamination, tends to occur. Particularly, in recent years, laminated ceramic condensers are required to have higher capacity and it is studied to further increase the number of layers and to reduce a film thickness, and therefore, the occurrence of delamination is critical in the laminated ceramic condensers in which a film thickness is extremely reduced like this. And, since ethyl cellulose has a poor thermal decomposition property, there was also a problem that a carbon component remains after burning even though it is subjected to degreasing treatment and therefore electric characteristics were impaired.

On the other hand, for example, when ethyl cellulose is used as a binder resin of glass paste for producing barrier ribs of a plasma display panel, there was a problem that since ethyl cellulose has low alkali resistance and low adhesive property to glass, peeling occurs in a developing step and the barrier ribs are not formed into a desired pattern.

For this situation, it is studied that a polyvinyl acetal resin is used as a binder resin for coating paste. Since a polyvinyl acetal resin has high adhesive property to a ceramic green sheet, it is thought that if it is used as a binder resin of conductive paste or ceramic paste for producing a laminated ceramic condenser, the problem of peeling between layers will be resolved. And, since the polyvinyl acetal resin has high alkali resistance, it is possible to inhibit the occurrence of peeling in a developing step when the polyvinyl acetal resin is used as a binder resin of glass paste for producing barrier ribs of a plasma display panel.

However, the paste obtained by using the polyvinyl acetal resin as a binder resin has a problem that it has a poor coating property and it causes problems such as being stringy and clogging particularly on the occasion of coating by screen printing and consequently a peel-off, property is deteriorated and the precision of thickness is reduced, and therefore patterns cannot be clearly drawn and production yields decrease.

Patent Document No. 1: Patent Kohyo Publication Hei-3-35762
Patent Document No. 2: Patent Kohyo Publication Hei-4-49766
Patent Document No. 3: Patent Kokai Publication 2002-280250
Patent Document No. 4: Patent Kokai Publication Hei-8-222135
Patent Document No. 5: Patent Kokai Publication 2002-63849

DISCLOSURE OF THE INVENTION

Problems which the Invention is to Solve

In view of the above state of the art, it is an object of the present invention to provide a binder resin for coating paste, comprising a polyvinyl acetal type resin, having an excellent dispersibility of inorganic powder such as conductive powder, ceramic powder and glass powder and being capable of exerting an extremely excellent coating property, particularly a printing property, when dispersing the inorganic powder to form paste, conductive paste, ceramic paste and glass paste.

Means for Solving the Object

The present invention is a binder resin for coating paste for forming a film or a film pattern by coating, which comprises a modified polyvinyl acetal resin comprising structural units represented by the following general formulas (1), (2), (3) and (4):

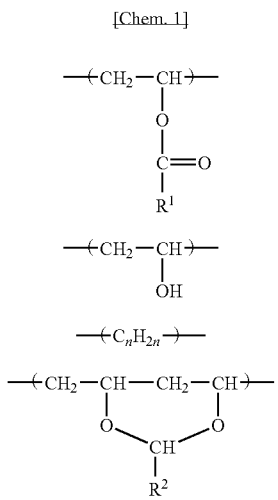

in the formulas, $R^1$ represents a straight chain or branched alkyl group having 1 to 20 carbon atoms, and $R^2$ represents hydrogen, a straight chain, branched or cyclic alkyl group having 1 to 20 carbon atoms, or an aryl group; and n represents an integer of 1 to 8; and further in the modified polyvinyl acetal resin, a content of the structural unit represented by the general formula (3) is 1 to 20 mol % and a content of the structural unit represented by the general formula (4) is 30 to 78 mol %.

Hereinafter, the present invention will be described in detail.

The present inventors made earnest investigations and consequently found that paste, which is superior in adhesive property to a ceramic green sheet and alkali resistance, which is furthermore superior in a coating property and which can be coated by screen printing, can be obtained if using a modified polyvinyl acetal resin having a specific structure as a binder resin to complete the present invention.

The binder resin for coating paste of the present invention comprises a modified polyvinyl acetal resin comprising structural units represented by the above general formulas (1), (2), (3) and (4).

The above modified polyvinyl acetal resin comprises a vinyl ester unit represented by the general formula (1), a vinyl alcohol unit represented by the general formula (2), an α-olefin unit represented by the general formula (3) and an acetal unit represented by the general formula (4). Such a modified polyvinyl acetal resin is extremely superior in adhesive property to a ceramic green sheet comprising a polyvinyl acetal resin as a binder resin and is superior in alkali resistance, since it has a structure similar to polyvinyl acetal. And, by adjusting various properties such as viscosity and thixotropy by selections of the proportions of the structural units and $R^1$, $R^2$, or selection of n, it is possible to obtain paste which can exert an excellent coating property and has particularly an excellent screen printing property.

In the above modified polyvinyl acetal resin, a content of the α-olefin unit represented by the general formula (3) is 1 to 20 mol %. When the content is less than 1 mol %, a coating property of the paste to be obtained is poor and a thermal decomposition property of the binder resin for coating paste is poor and therefore a residue is produced in burning. When the content is more than 20 mol %, the solubility of the modified polyvinyl acetal resin in a solvent is low and therefore the modified polyvinyl acetal resin cannot be used as a binder resin for coating paste, or the temporal stability of viscosity of the binder resin for coating paste is deteriorated. It is preferably 1 to 10 mol %, and more preferably 2 to 8 mol %.

The above α-olefin unit is not particularly limited and includes, for example, units derived from ethylene, propylene, 1-butene, 1-pentene, 1-hexene, 1-heptene, 1-octene, 4-methyl-1-pentene and the like. Among others, it is suitable to be an ethylene unit derived from ethylene.

In the above modified polyvinyl acetal resin, when the α-olefin unit represented by the general formula (3) connects with one another in sequence, a preferable upper limit of the number of the α-olefin units connecting with one another in sequence is 10. When the number of the α-olefin units is more than 10, there may be cases where the solubility of the modified polyvinyl acetal resin in a solvent is low and the modified polyvinyl acetal resin cannot be used as a binder resin for coating paste.

In the above modified polyvinyl acetal resin, a content of acetal unit represented by the general formula (4) is 30 to 78 mol %. When the content is less than 30 mol %, the modified polyvinyl acetal resin to be obtained becomes insoluble in an organic solvent and this interferes with the preparation of paste. When it is more than 78 mol %, an amount of a residual hydroxyl group becomes less and the toughness of the modified polyvinyl acetal resin to be obtained may be impaired and the strength of a coat in printing the paste may be deteriorated. It is preferably 55 to 78 mol %.

In the above modified polyvinyl acetal resin, when two or more of acetal units represented by the general formula (4) connect with one another, the proportion that adjacent acetal groups are in a trans configuration is preferably 30 to 70%. When the proportion is less than 30%, there may be cases where the solubility of the modified polyvinyl acetal resin in a solvent is low and the modified polyvinyl acetal resin cannot be used as a binder resin for coating paste, and when it is more than 70%, storage stability may be low, for example, as an acetal bond tends to dissociate and a change in viscosity becomes large.

In the above modified polyvinyl acetal resin, a content of vinyl alcohol unit represented by the general formula (2) is preferably 20 to 30 mol %. When the content is less than 20 mol %, there may be cases where the solubility of the modified polyvinyl acetal resin in a solvent is low and the modified polyvinyl acetal resin cannot be used as a binder resin for coating paste, and when it is more than 30 mol %, the dispersibility of the conductive powder, the ceramic powder and the glass powder may be low. It is more preferably 20 to 27 mol %.

In the above modified polyvinyl acetal resin, when two or more of vinyl alcohol units represented by the general formula (2) connect with one another, the proportion that adjacent hydroxyl groups are in a trans configuration is preferably 60% or more. When the proportion is 60% or more, an interaction between a hydroxyl group in one molecule and a hydroxyl group in another molecule becomes larger than an interaction between hydroxyl groups in a molecule and affinity of the conductive powder, the ceramic powder and the glass powder is enhanced, and therefore the dispersibility of these is improved. It is more preferably 70% or more.

In the above modified polyvinyl acetal resin, a content of the vinyl ester unit represented by the general formula (1) is not particularly limited.

The above modified polyvinyl acetal resin may further comprises components derived from ethylenic unsaturated monomers such as acrylic acid, methacrylic acid, phthalic acid (phthalic anhydride), maleic acid (maleic anhydride), itaconic acid (itaconic anhydride), acrylonitrile, methacrylonitrile, acrylamide, methacrylamide, trimethyl-(3-acrylamide-3-dimethylpropyl)-ammonium chloride, acrylamide-2-methylpropanesulfonic acid and sodium salt thereof, ethyl vinyl ether, butyl vinyl ether, N-vinylpyrrolidone, vinyl chloride, vinyl bromide, vinyl fluoride, vinylidene chloride, vinylidene fluoride, tetrafluoroethylene, sodium vinylsulfonate and sodium allylsulfonate. By containing a component derived from these ethylenic unsaturated monomers, it is possible to impart the temporal stability of viscosity to the above modified polyvinyl acetal resin. However, even when containing the component derived from these ethylenic unsaturated monomers, the content is preferably less than 2.0 mol %.

A polymerization degree of the above modified polyvinyl acetal resin is not particularly limited but it is preferably 300 to 2400. When the polymerization degree is less than 300, the strength of a coat obtained by screen printing is low and this coat may become apt to generate cracks and the like, and when it is more than 2400, since the viscosity of the conductive paste becomes too high, handling may be deteriorated.

An α-terpineol solution of the modified polyvinyl acetal resin adjusted to have viscosity of 6.0 Pa·s measured at 25° C. under the conditions of a shear rate of 60 s$^{-1}$ using an E type viscometer preferably has a ratio ($\eta 60/\eta 600$) between viscosity $\eta 60$ measured under the conditions of a shear rate of 60 s$^{-1}$ and viscosity $\eta 600$ measured under the conditions of a shear rate of 600 s$^{-1}$ at 25° C. using an E type viscometer being 2.0 to 5.0.

And, an α-terpineol solution of the modified polyvinyl acetal resin adjusted to have viscosity of 6.0 Pa·s measured at 25° C. under the conditions of a shear rate of 60 s$^{-1}$ using an E type viscometer preferably has a phase angle at 1 Hz and at a stress of 1000 Pa being 87° or more.

Further, an α-terpineol solution of the modified polyvinyl acetal resin adjusted to have viscosity of 6.0 Pa·s measured at 25° C. under the conditions of a shear rate of 60 s$^{-1}$ using an E type viscometer preferably has a ratio ($\eta 600 \rightarrow 60/\eta 600$) between viscosity $\eta 600$ measured at a shear rate of 600 s$^{-1}$ and viscosity $\eta 60$ measured after a lapse of 10 seconds from changing a shear rate to 60 s$^{-1}$ using an E type viscometer being 1.9 or more, in the case of changing a shear rate from 600 s$^{-1}$ to 60 s$^{-1}$ at 25° C.

The present inventors made earnest investigations on screen printing the paste prepared using the binder resin for coating paste of the present invention, and they have found that three different functions of the coating property, the peel-off property and the shape retaining property are required for paste in order to perform good screen printing. That is, in order to screen print the obtained paste, generally, the screen, on which a pattern is formed, is overlaid on the printing surface, and paste is applied onto it with a squeegee, and then the screen is lifted vertically and peeled off from the printing surface. In this case, it is important that first, paste is surely filled into the pattern of the screen in coating the paste (the coating property), and the screen is peeled off from the paste without paste being adhesive to the screen or paste being stringy in lifting the screen (the peel-off property), and a pattern of the paste left after peeling off the screen does not deform due to self-weight (the shape retaining property).

The present inventors further made earnest investigations and consequently found that paste which is further superior in the coating property, the peel-off property and the shape retaining property, respectively, can be obtained by using a modified polyvinyl acetal resin having specific properties as a binder resin.

The paste obtainable by using the binder resin for coating paste comprising the modified polyvinyl acetal resin, which has a ratio ($\eta 60/\eta 600$) between viscosity $\eta 60$ measured under the conditions of a shear rate of 60 s$^{-1}$ and viscosity $\eta 600$ measured under the conditions of a shear rate of 600 s$^{-1}$ at 25° C. using an E type viscometer being 2.0 to 5.0, in the α-terpineol solution of the modified polyvinyl acetal resin adjusted to have viscosity measured at 25° C. under the conditions of a shear rate of 60 s$^{-1}$ using an E type viscometer is 6.0 Pa·s, has a particularly excellent coating property.

In order to realize uniform coating in applying the paste onto the screen, on which a pattern is formed, with a squeegee, the paste is required to have relatively high viscosity in such a way the paste can be easily applied and spread with a squeegee. On the other hand, in order to fill the paste into the pattern of the screen uniformly throughout the pattern without being unevenly distributed, the paste is required to have adequately low viscosity. That is, a large change in viscosity is necessary between before and after applying pressure with a squeegee. Such a property is referred to as thixotropy and the above ratio $\eta 60/\eta 600$ is one of indicators representing thixotropy.

When $\eta 60/\eta 600$ is less than 2.0, the viscosity in coating is too low and therefore paste cannot be applied and spread uniformly or the viscosity of the paste filled into the pattern of the screen is too high and the paste does not spread uniformly within the pattern. When it is more than 5.0, the viscosity in coating is too high and therefore paste cannot be applied and spread uniformly. It is more preferably 2.3 to 3.0.

Further, the reason why the α-terpineol solution of the modified polyvinyl acetal resin adjusted to have viscosity of 6.0 Pa·s measured at 25° C. under the conditions of a shear rate of 60 s$^{-1}$ using an E type viscometer is used is that a model paste in the case of using the modified polyvinyl acetal resin as a binder resin is assumed in consideration of the concentration of a binder resin in coating paste usually employed, the viscosity of paste and the like (The following is the same).

The paste obtainable by using the binder resin for coating paste comprising the modified polyvinyl acetal resin, which has a phase angle at 1 Hz and at a stress of 1000 Pa being 87° or more, in the α-terpineol solution of the modified polyvinyl acetal resin adjusted to have viscosity measured at 25° C. under the conditions of a shear rate of 60 s$^{-1}$ using an E type viscometer is 6.0 Pa·s, has a particularly excellent peel-off property.

When a screen is peeled off after coating the paste, it is required that the screen is peeled off from the paste without the paste being adhesive to the screen or the paste being stringy. The phase angle sa value representing a ratio of viscosity and elasticity of a substance, and in viscous substance like paste, it is generally thought that a substance having a phase angle closer to 90° is more viscous and has a good cutoff property like water. When the phase angle at 1 Hz and at stress of 1000 Pa is less than 87°, a cutoff property of paste in peeling off a screen is poor and the paste gets much stringy.

Incidentally, the phase angle can be measured by a dynamic mechanical analysis which measures while applying a constant frequency. And, the phase angle at 1 Hz and at stress of 1000 Pa is employed in consideration of stress applied to paste in peeling off a screen in a usual step.

The paste obtainable by using the binder resin for coating paste comprising the modified polyvinyl acetal resin, which has a ratio ($\eta 600 \rightarrow 60/\eta 600$) between viscosity $\eta 600$ measured at a shear rate of 600 s$^{-1}$ and viscosity $\eta 60$ measured after a lapse of 10 seconds from changing a shear rate to 60 s$^{-1}$ using an E type viscometer being 1.9 or more, in the α-terpineol solution of the modified polyvinyl acetal resin adjusted to have viscosity measured at 25° C. under the conditions of a shear rate of 60 s$^{-1}$ using an E type viscometer is 6.0 Pa·s, has a particularly excellent shape retaining property.

When the paste is applied onto the screen on which the pattern is formed as described above, the paste penetrating into the pattern is required to have adequately low viscosity in order to fill it uniformly throughout the pattern without filling it unevenly. On the other hand, if the viscosity remains low after the screen is peeled off, it is impossible to maintain the pattern form due to deformation by self-weight. Therefore, the paste which has decreased in viscosity once by developing the thixotropy has to increase in viscosity immediately after being filled, into the pattern. The ratio $\eta 600 \rightarrow 60/\eta 600$ represents how far the viscosity of the resin solution reduced by applying pressure to the resin solution recovers when the pressure applied to the resin solution is removed. Here, the reason why timing of measuring the viscosity is taken as after a lapse of 10 seconds is that a time required to fill the paste into a pattern and a time from coating up to peeling a screen in a normal step are considered. When the ratio $\eta 600 \rightarrow 60/\eta 600$ is less than 1.9, the viscosity of paste in peeling the screen is too low and therefore a form of a pattern cannot be retained. It is more preferably 2.0 or more.

The above modified polyvinyl acetal resin can be produced by acetalizing modified polyvinyl alcohol in which a content of α-olefin unit is 1 to 20 mol % and a saponification degree is 80 mol % or higher.

The above modified polyvinyl alcohol can be obtained by saponifying a copolymer obtainable by copolymerizing vinyl ester and α-olefin. As the vinyl ester used for this case, there are used, for example, vinyl formate, vinyl acetate, vinyl propionate and vinyl pivalate. Among others, vinyl acetate is suitable from the viewpoint of economy. And, to obtain modified polyvinyl acetal comprising components derived from the above ethylenic unsaturated monomers, the ethylenic unsaturated monomers are further copolymerized. And, end modified polyvinyl alcohol, which is obtained by saponifying a copolymer obtainable by copolymerizing vinyl ester type monomer such as vinyl acetate and α-olefin in the presence of a thiol compound such as thiolacetic acid and mercaptopropionic acid, can also be employed.

A lower limit of the saponification degree of the above modified polyvinyl alcohol is 80 mol %. When the saponification degree is less than 80 mol %, the solubility of modified polyvinyl alcohol in water becomes low and therefore this causes an acetalization reaction to be difficult, and when an amount of a hydroxyl group is low, the acetalization reaction itself becomes difficult.

When the above modified polyvinyl alcohol is used, it is necessary to use modified polyvinyl alcohol in which the content of α-olefin is within a range of 1 to 20 mol %. If the content of α-olefin is within a range of 1 to 20 mol %, the above modified polyvinyl alcohol may be used alone, and if the content of α-olefin of the modified polyvinyl acetal resin ultimately obtained will be 1 to 20 mol %, a mixture of modified polyvinyl alcohol and unmodified polyvinyl alcohol may be used. Also, with respect to the saponification degree, if the saponification degree of modified polyvinyl alcohol in the case of acetalizing is 80 mol % or more, the modified polyvinyl alcohol may be used. alone, or a mixture, which is obtainable by adjusting and mixing the modified polyvinyl alcohol having the saponification degree of 80 mol % or more and modified polyvinyl alcohol having a saponification degree of less than 80 mol % in such a way that an overall saponification degree is 80 mol % or more, may be used.

The above modified polyvinyl acetal resin can be produced by acetalizing the above modified polyvinyl alcohol. A method of acetalization is not particularly limited and publicly known methods can be employed, and for example, a method of adding various aldehydes to an aqueous solution of the above modified polyvinyl alcohol in the presence of an acid catalyst such as hydrochloric acid is given.

The above aldehyde to be used for acetalization is not limited and include, for example, formaldehyde (including paraformaldehyde), acetaldehyde (including paraacetaldehyde), propionaldehyde, butylaldehyde, amilaldehyde, hexyl aldehyde, heptyl aldehyde, 2-ethylhexyl aldehyde, cyclohexyl aldehyde, furfural, glyoxal, glutaraldehyde, benzaldehyde, 2-methylbenzaldehyde, 3-methylbenzaldehyde, 4-methylbenzaldehyde, p-hydroxybenzaldehyde, m-hydroxybenzaldehyde, phenylacetaldehyde and β-phenylpropionaldehyde. Among others, acetaldehyde or butylaldehyde is favorably used in point of a balance between productivity and characteristics. These aldehydes may be used alone or in combination of two or more species.

An acetalization degree of the above acetalization is preferably within a range of 30 to 78 mol % in terms of the overall acetalization degree in either case of using aldehyde alone or mixed aldehyde. When the overall acetalization degree is less than 30 mol %, the resin becomes soluble in water and insoluble in an organic solvent and this interferes with the preparation of paste. When the overall acetalization degree is more than 78 mol %, an amount of a residual hydroxyl group becomes less and the toughness of the modified polyvinyl acetal resin may be impaired and the strength of a coat in printing the paste may be deteriorated.

In addition, in a calculation method of the acetalization degree in the present description, because an acetal group of the modified polyvinyl acetal resin is formed from two hydroxyl groups by acetalization, a method of counting two hydroxyl groups acetalized is employed to calculate mol % of the acetalization degree.

The binder resin for coating paste of the present invention may comprise the above modified polyvinyl acetal resin alone or may be a mixed resin of a resin usually used as a binder resin such as acrylic resin, cellulose resin, polyvinyl acetal resin. In the latter case, a preferable lower limit of the content of the above modified polyvinyl acetal resin is 30% by weight.

In the binder resin for coating paste of the present invention, it is preferred that a content of alkaline metal is 500 ppm or less. When the content is more than 500 ppm, electric characteristics may deteriorate in forming conductive paste from this binder resin. It is more preferably 200 ppm or less.

Incidentally, the content of alkaline metal can be measured by an atomic absorption method.

In the binder resin for coating paste of the present invention, it is preferred that a concentration of halogen is 500 ppm or less. When the content is more than 500 ppm, electric characteristics may deteriorate in forming conductive paste from this binder resin. It is more preferably 200 ppm or less.

Incidentally, the content of halogen can be measured by an ion chromatography method.

Since the binder resin for coating paste of the present invention comprises polyvinyl acetal-based resin, if it is used as a binder of the conductive paste or the ceramic paste in producing a laminated ceramic condenser, the resulting binder has a high affinity for the ceramic green sheet and can inhibit the occurrence of delamination. And, since it has excellent alkali resistance and adhesion with glass, peeling does not occur in a developing step and defects such as a chip is scarcely occur in glass ribs when it is used as a binder of glass paste on the occasion of preparing barrier ribs of a plasma display panel (PDP), and therefore desired patterns can be formed. Further, the resulting paste can develop an extremely excellent coating property, especially a screen printing property.

An application as a binder resin for coating paste of a resin composition comprising a modified polyvinyl acetal resin consisting of structural units represented by the following general formulas (1), (2), (3) and (4) also constitutes the present invention.

Conductive paste which comprises the binder resin for coating paste of the present invention, conductive powder and an organic solvent also constitutes the present invention.

Ceramic paste which comprises the binder resin for coating paste of the present invention, ceramic powder and an organic solvent also constitutes the present invention.

Glass paste which comprises the binder resin for coating paste of the present invention, glass powder and an organic solvent also constitutes the present invention.

The conductive paste of the present invention comprises conductive powder and an organic solvent in addition to the binder resin for coating paste of the present invention.

The above conductive powder is not particularly limited as long as it exhibits sufficient conductivity and includes, for example, fine particles comprising nickel, palladium, platinum, gold, silver, copper and alloys thereof. These metal materials may be used alone or in combination of two or more species.

A blending amount of the binder resin for coating paste of the present invention in the conductive paste of the present invention is not particularly limited, but a H preferable lower limit is 3 parts by weight and a preferable upper limit is 25 parts by weight to 100 parts by weight of the conductive powder. When the blending amount is less than 3 parts by weight, the ability of the conductive paste to form a film may be poor, and when it is more than 25 parts by weight, a carbon component tends to remain after degreasing and burning. The lower limit is more preferably 5 parts by weight and the upper limit is more preferably 15 parts by weight.

The above organic solvent is not particularly limited and includes, for example, ketones such as acetone, methyl ethyl ketone, dipropyl ketone, diisobutyl ketone; alcohols such as methanol, ethanol, isopropanol, butanol; aromatic hydrocarbons such as toluene, xylene; esters such as methyl propionate, ethyl propionate, butyl propionate, methyl butanoate, ethyl butanoate, butyl butanoate, methyl pentanoate, ethyl pentanoate, butyl pentanoate, methyl hexanoate, ethyl hexanoate, butyl hexanoate, 2-ethylhexyl acetate, 2-ethylhexyl butyrate, terpineol acetate, dehydroterpineol acetate; methyl cellosolve, ethyl cellosolve, butyl cellosolve, α-terpineol, dehydroterpineol, butyl cellosolve acetate and butyl carbitol acetate. These organic solvents may be used alone or in combination of two or more species.

The conductive paste of the present invention may further comprises a dispersant.

The above dispersant is not particularly limited but, for example, fatty acids, aliphatic amines, alkanolamides and phosphate esters are suitable.

The above fatty acid is not particularly limited and includes, for example, saturated fatty acids such as behenic acid, stearic acid, palmitic acid, myristic acid, lauric acid, capric acid, caprylic acid, coconut fatty acid; and unsaturated fatty acids such as oleic acid, linoleic acid, linolenic acid, sorbic acid, tallowate, hydrogenated castor oil fatty acid. Among others, lauric acid, stearic acid and oleic acid are suitable.

The above aliphatic amine is not particularly limited and includes, for example, laurylamine, myristylamine, cetylamine, stearylamine, oleylamine, alkyl(coconut)amine, alkyl(hydrogenated tallow)amine, alkyl(tallow)amine and alkyl(soybean)amine.

The above alkanolamide is not particularly limited and includes, for example, coconut fatty acid diethanol amide, tallowate diethanol amide, lauric acid diethanol amide and oleic acid diethanol amide.

The above phosphate ester is not particularly limited and includes, for example, polyoxyethylene alkyl ether phosphate ester and polyoxyethylene alkyl allyl ether phosphate ester.

The conductive paste of the present invention may comprises publicly known additives such as a plasticizer, a lubricant, an antistatic agent to the extent of not impairing an effect of the present invention.

The ceramic paste of the present invention contains a ceramic powder and an organic solvent in addition to the binder resin for coating paste of the present invention.

The above ceramic powder is not particularly limited and includes, for example, ceramic powders comprising alumina, zirconia, aluminum silicate, titanium oxide, zinc oxide, barium titanate, magnesia, sialon, spinel mullite, silicon carbide, silicon nitride, aluminum nitride or the like. These ceramic powders may be used alone and in combination of two or more species. Among others, ceramic powder comprising the same component as that of ceramic powder comprised in the ceramic green sheet to be used is preferable.

A blending amount of the binder resin for coating paste of the present invention in the ceramic paste of the present invention is not particularly limited, but a preferable lower limit is 1 part by weight and a preferable upper limit is 50 parts by weight to 100 parts by weight of the above ceramic powder. When the blending amount is less than 1 part by weight, the ability of the ceramic paste to form a film may be poor, and when it is more than 50 parts by weight, a carbon component tends to remain after degreasing and burning. The lower limit is more preferably 3 parts by weight and the upper limit is more preferably 30 parts by weight.

The organic solvent in the ceramic paste of the present invention is similar to that in the conductive paste. And, the ceramic paste of the present invention may comprise various additives such as a dispersant as with the conductive paste.

The glass paste of the present invention comprises glass powder and an organic solvent in addition to the binder resin for coating paste of the present invention.

The above glass powder is not particularly limited and includes, for example, lead oxide-boron oxide-silicon oxide-calcium oxide type glass, zinc oxide-boron oxide-silicon oxide type glass, lead oxide-zinc oxide-boron oxide-silicon oxide type glass and the like. Theses glass may be used alone or in combination of two or more species. Aluminum oxide and the like may be used in combination to the extent that the object of the present invention is not impaired.

A preferable lower limit of an average particle size of the above glass powder is 0.05 μm and a preferable upper limit is 10 μm. When the average particle size is less than 0.05 μm, barrier ribs may collapse in burning, and when it is more than 10 μm, it becomes difficult to make closely packed barrier ribs.

A blending amount of the binder resin for coating paste of the present invention in the glass paste of the present invention is not particularly limited, but a preferable lower limit is 2 parts by weight and a preferable upper limit is 40 parts by weight to 100 parts by weight of the above glass powder. When the blending amount is less than 2 parts by weight, it may be impossible to bind the glass powder securely, and when it is more than 40 parts by weight, a carbon component tends to remain after degreasing and burning. The lower limit is more preferably 4 parts by weight and the upper limit is more preferably 25 parts by weight.

The organic solvent in the glass paste of the present invention is similar to that in the conductive paste. And, the glass paste of the present invention may comprise various additives such as a dispersant as with the conductive paste.

A method of producing the conductive paste, the ceramic paste and the glass paste of the present inventions is not particularly limited and includes, for example, a method of mixing the above-mentioned modified polyvinyl acetal resin, organic solvent, and conductive paste, ceramic paste or glass paste with various mixers such as a blender mill and a three roll.

By coating the conductive paste, the ceramic paste and the glass paste of the present invention by a method such as screen printing, an extremely precise coat comprising inorganic powder can be formed.

A method of forming a film: comprising inorganic powder, which comprises a step of mixing a binder resin for coating paste comprising a modified polyvinyl acetal resin comprising structural units represented by the following general formulas (1), (2), (3) and (4), an organic solvent and inorganic powder, preparing paste form, and coating it, also constitutes the present invention.

In accordance with the present invention, it is possible to provide a binder resin for coating paste, comprising a polyvinyl acetal type resin, having an excellent dispersibility of inorganic powder such as conductive powder, ceramic powder and glass powder and being capable of exerting an extremely excellent coating property, particularly a printing property, when dispersing the inorganic powder to form paste, conductive paste, ceramic paste and glass paste.

BEST MODE FOR CARRYING OUT THE INVENTION

Hereinafter, the present invention will be described in more detail by way of examples, but the present invention is not limited to these examples.

EXAMPLE 1

193 g of modified polyvinyl alcohol, having a polymerization degree of 1700, an ethylene content of 10 mol % and a saponification degree of 88 mol %, was added to 2,900 g of pure water and the mixture was stirred at a temperature of 90° C. for about 2 hours and dissolved. This solution was cooled to 28° C., and to this solution, 20 g of hydrochloric acid of 35 weight % concentration and 115 g of n-butyl aldehyde were added, and a temperature of the mixture was lowered to 20° C. and kept at this temperature and an acetalization reaction was carried out and precipitate a reaction product. Then, a liquid temperature was kept at 30° C. for 5 hours to complete an acetalization reaction. The reaction product was neutralized, water-washed and dried by a normal method to obtain white powder of a modified polyvinyl acetal resin.

The resulting modified polyvinyl acetal resin was dissolved in DMSO-d6 (dimethylsulfoxide), and a degree of butyralization and a quantity of hydroxyl group were measured using $^{13}$C-NMR (Nuclear Magnetic Resonance spectrometer) to obtain the butyralization degree of 55 mol % and the hydroxyl group quantity of 23 mol %. The obtained modified polyvinyl acetal resin was employed as a binder resin for coating paste.

To 100 parts by weight of nickel fine particles ("2020SS", manufactured by MITSUI MINING & SMELTING Co., Ltd.) as conductive powder, 7 parts by weight of the obtained binder resin for coating paste and 60 parts by weight of α-terpineol were added, and this mixture was kneaded with a three roll to obtain conductive paste.

To 100 parts by weight of barium titanate having an average particle diameter of 0.3 μm ("BT-03", manufactured by Sakai Chemical Industry Co., Ltd.) as ceramic powder, 7 parts by weight of the obtained binder resin for coating paste and 60 parts by weight of α-terpineol were added, and this mixture was kneaded for 48 hours with a ball mill to obtain ceramic paste.

To 100 parts by weight of a lead oxide-boron oxide-silicon oxide-aluminum oxide type glass powder (respective compositions: 66% by weight, 5% by weight, 24% by weight, 5% by weight) as glass powder, 5 parts by weight of the obtained binder resin for coating paste and 30 parts by weight of α-terpineol were added, and this mixture was mixed with a ball mill to obtain glass paste.

EXAMPLE 2

A modified polyvinyl acetal resin having a butyralization degree and a hydroxyl group quantity, which are equivalent to those of Example 1, was prepared by following the same method as Example 1 except for using a modified polyvinyl alcohol having a polymerization degree of 1000, an ethylene content of 10 mol % and a saponification degree of 88 mol %, and the resulting modified polyvinyl acetal resin was used as a binder resin for coating paste to obtain conductive paste, ceramic paste and glass paste.

EXAMPLE 3

A modified polyvinyl acetal resin having a butyralization degree and a hydroxyl group quantity, which are equivalent to those of Example 1, was prepared by following the same method as Example 1 except for using a modified polyvinyl alcohol having a polymerization degree of 800, an ethylene content of 10 mol % and a saponification degree of 88 mol %.

The obtained modified polyvinyl acetal resin was mixed with a polyvinyl butyral resin (manufactured by Sekisui Chemical Co., Ltd., S-LEC B "BM-S") so as to have a weight ratio of 6:4, and the resulting mixed resin was used as a binder resin for coating paste to obtain conductive paste, ceramic paste and glass paste.

EXAMPLE 4

A modified polyvinyl acetal resin was prepared by following the same method as Example 1 except for using a modified polyvinyl alcohol having a polymerization degree of 600, an ethylene content of 5 mol % and a saponification degree of 93 mol % and using a mixture of n-butyl aldehyde and acetaldehyde in proportions of 2:1 by weight as aldehyde to be used for acetalization reaction, and the resulting modified polyvinyl acetal resin was used as a binder resin for coating paste to obtain conductive paste, ceramic paste and glass paste. This resin had the acetalization degree of 60 mol % and the hydroxyl group quantity of 28 mol %.

EXAMPLE 5

A modified polyvinyl acetal resin was prepared by following the same method as Example 1 except for using a modified polyvinyl alcohol having a polymerization degree of 1700, an ethylene content of 5 mol % and a saponification degree of 98 mol %, and the resulting modified polyvinyl acetal resin was used as a binder resin for coating paste to obtain conductive paste, ceramic paste and glass paste. This resin had the butyralization degree of 70 mol % and the hydroxyl group quantity of 23 mol %.

In addition, the concentrations of alkaline metal and halogen of the modified polyvinyl acetal resin prepared in Examples 1 to 5 were 500 ppm or less.

COMPARATIVE EXAMPLE 1

A commercially available ethyl cellulose (manufactured by Dow Chemical Company, "STD-100") was used as a binder resin for coating paste to obtain conductive paste, ceramic paste and glass paste.

COMPARATIVE EXAMPLE 2

A commercially available polyvinyl butyral resin not modified with ethylene (manufactured by Sekisui Chemical Co., Ltd., S-LEC B "BM-S") was used as a binder resin for coating paste to obtain conductive paste, ceramic paste and glass paste.

COMPARATIVE EXAMPLE 3

A commercially available acrylic resin (manufactured by Rohm & Haas company, "B-66") was used as a binder resin for coating paste to obtain conductive paste, ceramic paste and glass paste.

(Evaluation)

The obtained binder resins for coating paste, conductive paste, ceramic paste and glass paste were evaluated according to the following method.

Results of evaluations are shown in Table 1.

(1) Evaluation of a Thermal Decomposition Property of a Binder Resin for Coating Paste 10 mg of the binder resin was heated at a temperature rising rate of 10° C./minute from room temperature to 700° C. in a nitrogen atmosphere, and an amount of thermal decomposition residue produced was measured.

(2) Evaluation of Conductive Paste (2-1) Evaluation of a Screen Printing Property of Conductive Paste The number of times of a defect of printing occurrence in printing a line pattern of 20 lines/cm sequentially using a polyester screen of 300 mesh was counted.

(2-2) Evaluation of a Thermal Decomposition Property and an Occurrence of Delamination of a Ceramic Green Sheet Laminate 10 parts by weight of a polyvinyl butyral resin (manufactured by Sekisui Chemical Co., Ltd., S-LEC B "BM-S", a polymerization degree of 800) was added to admixed solvent of 30 parts by weight of toluene and 15 parts, by weight of ethanol and the resulting mixture was stirred and dissolved, and further to this solution, 3 parts by weight of dibutyl phthalate was added as a plasticizer and the mixture was stirred and dissolved. To the resin solution obtained, 100 parts by weight of barium titanate ("BT-01 (an average particle size of 0.3 µm)" manufactured by Sakai Chemical Industry Co., Ltd.) was added as ceramic powder, and this mixture was mixed for 48 hours with a ball mill to obtain a ceramic slurry composition. The obtained ceramic slurry composition was applied onto the polyester film, which was subjected to releasing treatment, so as to be about 5 µm in a dried thickness and air-dried at room temperature for 1 hour and further dried at 80° C. for 3 hours and subsequently at 120° C. for 2 hours with a hot air dryer to obtain a ceramic green sheet.

The ceramic green sheet obtained was cut in sheets of a size of 5 cm square, and a substance formed by screen printing the obtained conductive paste on this sheet was overlaid on another up to 100 sheets and the overlaid sheets were thermally bonded to another at 70° C. by pressure of 150 kg/cm² for 10 minutes to obtain a ceramic green sheet laminate.

The obtained ceramic green sheet laminate was heated at a temperature rising rate of 3° C./minute to 450° C. in a nitrogen atmosphere and kept at this temperature for 5 hours, and then heated at a temperature rising rate of 5° C./minute to 1350° C. and kept at this temperature for 10 hours to obtain a ceramic sintered body. The obtained ceramic sintered body was visually observed and a thermal decomposition property of the ceramic green sheet laminate was evaluated according to the following criteria.

○: the sheet was sintered uniformly and nothing other than ceramic powder was found Δ: black spot was rarely found in part in the sheet x: fairly many black spots were found in the ceramic green sheet.

Further, after this sintered body was cooled to room temperature, the sintered body was divided into two halves and the state of sheets of being just located near the 50th layer, was observed with an electron microscope, and the presence or absence of delamination between the ceramic layer and the conductive layer was observed, and an adhesive property was evaluated according to the following criteria.
○: no delamination was found
x: delamination was found (3) Evaluation of Ceramic Paste (3-1) Evaluation of a Screen Printing Property of Ceramic Paste 10 parts by weight of a polyvinyl butyral resin (manufactured by Sekisui Chemical Co., Ltd., S-LEC B "BM-S", a polymerization degree of 800) was added to a mixed solvent of 30 parts by weight of toluene and 15 parts by weight of ethanol and the resulting mixture was stirred and dissolved, and further to this solution, 3 parts by weight of dibutyl phthalate was added as a plasticizer and the mixture was stirred and dissolved. To the resin solution obtained, 100 parts by weight of barium titanate ("BT-03 (an average particle size of 0.3 μm)" manufactured by Sakai Chemical Industry Co., Ltd.) was added as a ceramic powder, and this mixture was mixed for 48 hours with a ball mill to obtain a ceramic slurry composition. The resulting ceramic slurry composition was applied onto the polyester film, which was subjected to releasing treatment, so as to be about 10 μm in a dried thickness and air-dried at room temperature for 1 hour and further dried at 80° C. for 3 hours and subsequently at 120° C. for 2 hours with a hot air dryer to obtain a ceramic green sheet.

Using a screen printing machine (MINOMAT Y-3540) and SX screen (SX 300B), which are manufactured by MINO-GROUP CO., LTD., the ceramic paste was screen printed on the ceramic green sheet, and the printed surface was observed visually or with a simple microscope and a screen printing property was evaluated according to the following criteria.
○: no ceramic paste was found in string form on the printed surface
x: ceramic paste was found in string form on the printed surface (3-2) Evaluation of an Adhesive Property The ceramic paste was applied onto a polyethylene terephthalate film so as to be 10 μm in a dried thickness and 1 cm square in size, and on this, the ceramic green sheet prepared in Evaluation (2-2) was laminated, and laminated layers were thermally bonded to another at 80° C. by pressure of 39 kg/cm² for 3 seconds to prepare a laminate. The peel strength in peeling off the obtained laminate at a speed of 0.49 mm/sec was measured using a high temperature tackiness tester (manufactured by Fujikopian Co., Ltd., FCL009 type).

(3-3) Production of a Laminated Ceramic Condenser

To 100 parts by weight of a nickel powder ("2020SS" manufactured by MITSUI MINING & SMELTING Co., Ltd.), 7 parts by weight of a binder resin and 60 parts by weight of α-terpineol were added and the mixture was mixed, and then this mixture was kneaded with a three roll to prepare conductive paste.

A ceramic green sheet, prepared by the same method as in (3-1) Evaluation of a screen printing property of ceramic paste, was cut in sheets of a size of 5 cm square, and this sheet was coated with the obtained conductive paste by screen printing. Then, an area on the ceramic green sheet, which was not coated with the conductive paste, was coated with ceramic paste by screen printing.

The coated ceramic green sheet was overlaid on another up to 100 sheets and the overlaid sheets were thermally bonded to another at 70° C. by pressure of 150 kg/cm² for 10 minutes to obtain a ceramic green sheet laminate.

The obtained ceramic green sheet laminate was heated at a temperature rising rate of 3° C./minute to 450° C. in a nitrogen atmosphere and kept at this temperature for 5 hours, and then heated at a temperature rising rate of 5° C./minute to 1350° C. and kept at this temperature for 10 hours to obtain a laminated ceramic condenser.

After the obtained laminated ceramic condenser was cooled to room temperature, it was divided into two halves and the state of the face of the divided sheets of being just located near the 50th layer, was observed with an electron microscope, and the presence or absence of delamination was observed.

(4) Evaluation of Glass Paste (4-1) Evaluation of Alkali Resistance

The glass paste was applied to a glass substrate and dried at 100° C. for 60 minutes. After drying, a photosensitive resist film was laminated on the dried paste and then exposed with light of 250 mJ/cm² via a pattern with 1 mm pitches. Next, this was immersed in a 0.5% aqueous solution of sodium hydrogencarbonate, and a state of the coat was observed over 300 seconds and evaluated according to the following criteria.
○: no change was found in the coat
x: peeling of the resist film and peeling of part of the glass film were found

TABLE 1

| | | Example1 | Example2 | Example3 | Example4 | Example5 | Comparative Example1 | Comparative Example2 | Comparative Example3 |
|---|---|---|---|---|---|---|---|---|---|
| Binder resin for coating paste | amount of thermal decomposition residue (%) | 0.05 | 0.08 | 0.10 | 0.05 | 0.06 | 3.40 | 2.50 | 0.00 |
| Conductive paste | screen printing property | >100 | >100 | >100 | >100 | >100 | >100 | <10 | <10 |
| | thermal decomposition property of laminate | ○ | ○ | ○ | ○ | ○ | Δ | x | ○ |
| | adhesive property of laminate | ○ | ○ | ○ | ○ | ○ | x | ○ | ○ |
| Ceramic paste | screen printing property | ○ | ○ | ○ | ○ | ○ | ○ | x | x |
| | delamination | not found | not found | not found | not found | not found | found | not found | not found |
| Glass paste | alkali resistance | ○ | ○ | ○ | ○ | ○ | x | ○ | ○ |

EXPERIMENTAL EXAMPLE 1

193 g of modified polyvinyl alcohol, having a polymerization degree of 1700, an ethylene content of 4 mol % and a saponification degree of 99 mol %, was added to 2,900 g of pure water and the mixture was stirred at a temperature of 90° C. for about 2 hours and dissolved. This solution was cooled to 28° C., and to this solution, 20 g of hydrochloric acid of 35 weight % concentration and 115 g of n-butyl aldehyde were added, and a temperature of the mixture was lowered to 20° C. and kept at this temperature and an acetalization reaction was carried out and precipitate a reaction product. Then, a liquid temperature was kept at 30° C. for 5 hours to complete an acetalization reaction. The reaction product was neutralized, water-washed and dried by a normal method to obtain white powder of a modified polyvinyl acetal resin.

The resulting modified polyvinyl acetal resin was dissolved in DMSO-d6 (dimethylsulfoxide), and a degree of butyralization and a quantity of hydroxyl group were measured using $^{13}$C-NMR (Nuclear Magnetic Resonance spectrometer) to obtain the butyralization degree of 66 mol % and the hydroxyl group quantity of 29 mol %.

Using α-terpineol as an organic solvent, the obtained modified polyvinyl acetal resin was dissolved to prepare a modified polyvinyl acetal resin solution (vehicle) having the viscosity of 6.0 Pa·s, which was measured at 25° C. under the conditions of a shear rate of 60 s$^{-1}$ using an E type viscometer.

To 100 parts by weight of nickel fine particles ("2020SS" manufactured by MITSUI MINING & SMELTING Co., Ltd.) as a conductive powder, 7 parts by weight of the obtained modified polyvinyl acetal resin and 60 parts by weight of α-terpineol were added, and this mixture was kneaded with a three roll to obtain conductive paste.

EXPERIMENTAL EXAMPLE 2

A modified polyvinyl acetal resin was obtained by following the same method as Example 1 except for using a mixture (a weight ratio of 6:1) of n-butyl aldehyde and acetaldehyde as aldehyde. The obtained modified polyvinyl acetal resin had the acetalization degree of 72 mol % and the hydroxyl group quantity of 23 mol %.

A vehicle and conductive paste were prepared by following the same method as Example 1 except for using the obtained modified polyvinyl acetal resin.

EXPERIMENTAL EXAMPLE 3

A modified polyvinyl acetal resin was obtained by following the same method as Example 1 except for using a mixture (a weight ratio of 1:2) of n-butyl aldehyde and acetaldehyde as aldehyde. The obtained modified polyvinyl acetal resin had the acetalization degree of 67 mol % and the hydroxyl group quantity of 28 mol %. A vehicle and conductive paste were prepared by following the same method as Example 1 except for using the obtained modified polyvinyl acetal resin.

EXPERIMENTAL EXAMPLE 4

A modified polyvinyl acetal resin was obtained by following the same method as Example 1 except for using acetaldehyde as aldehyde. The obtained modified polyvinyl acetal resin had the acetalization degree of 69 mol % and the hydroxyl group quantity of 26 mol %.

A vehicle and conductive paste were prepared by following the same method as Example 1 except for using the obtained modified polyvinyl acetal resin.

In addition, the concentrations of alkaline metal and halogen of the modified polyvinyl acetal resin prepared in Experimental Examples 1 to 4 were 200 ppm or less.

EXPERIMENTAL EXAMPLE 5

A vehicle and conductive paste were prepared by following the same method as Example 1 except for using a polyvinyl butyral resin not modified with ethylene (manufactured by Sekisui Chemical Co., Ltd., S-LEC B "BH-S") as a binder resin.

EXPERIMENTAL EXAMPLE 6

A vehicle and conductive paste were prepared by following the same method as Example 1 except for using ethyl cellulose (manufactured by Dow Chemical Company, "STD-100") as a binder resin.

(Evaluation)

The vehicles and the conductive paste prepared in Experimental Examples 1 to 6 were evaluated according to the following method.

Results of evaluations are shown in Table 2.

(1) Evaluation of a Coating Property (1-1) Measurement of η60/η600

With respect to the obtained vehicle, the viscosity η60 was measured under the conditions of a shear rate of 60 s$^{-1}$ and the viscosity η600 was measured under the conditions of a shear rate of 600 s$^{-1}$ at 25° C. using an E type viscometer, and the ratio (η60/η600) was determined.

(1-2) Evaluation of a Coating Property 10 parts by weight of a polyvinyl butyral resin (manufactured by Sekisui Chemical Co., Ltd., S-LEC B "BM-S", a polymerization degree of 800) was added to a mixed solvent of 30 parts by weight of toluene and 15 parts by weight of ethanol and the resulting mixture was stirred and dissolved, and further to this solution, 3 parts by weight of dibutyl phthalate was added as a plasticizer and the mixture was stirred and dissolved. To the resin solution obtained, 100 parts by weight of barium titanate ("BT-01 (an average particle size of 0.3 μm)" manufactured by Sakai Chemical Industry Co., Ltd.) was added as a ceramic powder, and this mixture was mixed for 48 hours with a ball mill to obtain a ceramic slurry composition. The obtained ceramic slurry composition was applied onto the polyester film, which was subjected to releasing treatment, so as to be about 5 μm in a dried thickness and air-dried at room temperature for 1 hour and further dried at 80° C. for 3 hours and subsequently at 120° C. for 2 hours with a hot air dryer to obtain a ceramic green sheet.

Using a screen printing machine (MINOMAT Y-3540) and SX screen (SX 300B), which are manufactured by MINO-GROUP CO., LTD., the conductive paste was screen printed on the ceramic green sheet, and the printed surface was observed visually or with a simple microscope and a coating property was evaluated according to the following criteria.

◯: no rubbing was found on the printed surface x: rubbing was found on the printed surface (2) Evaluation of a Peel-Off Property (2-1) Measurement of a Phase Angle With respect to the obtained vehicle, a phase angle was measured under the conditions of 1 Hz and of stress of 1000 Pa using an E type viscometer.

(2-2) Evaluation of a Peel-Off Property

The conductive paste was screen printed on the ceramic green sheet by the same method as in (1-2), and the printed surface was observed visually or with a simple microscope and a peel-off property was evaluated according to the following criteria.
○: no conductive paste was found in string form on the printed surface
x: conductive paste was found in string form on the printed surface (3) Evaluation of a Shape Retaining Property (3-1) Measurement of η600→60/η600

With respect to the obtained vehicle, when a shear rate was changed from 600 s$^{-1}$ to 60 s$^{-1}$ at 25° C., the viscosity η600 at a shear rate of 600 s$^{-1}$ was measured and the viscosity η60 after a lapse of 10 seconds from changing a shear, rate to 60 s$^{-1}$ was measured using an E type viscometer, and the ratio (η600→60/η600) was determined.

(3-2) Evaluation of a Shape Retaining Property

The conductive paste was screen printed on the ceramic green sheet by the same method as in (1-2), and the printed surface was observed visually or with a simple microscope and a shape retaining property was evaluated according to the following criteria.
○: no sag was found in the conductive paste of the printed surface
x: sag was found in the conductive paste of the printed surface (4) Evaluation of an Adhesive Property A ceramic green sheet, prepared by the same method as in (1-2), was cut in sheets of a size of 5 cm square, and a substance formed by screen printing the conductive paste on this sheet was laid over another up to 100 sheets and the overlaid sheets were thermally bonded to another at 70° C. by pressure of 150 kg/cm$^2$ for 10 minutes to obtain a ceramic green sheet laminate.

The obtained ceramic green sheet laminate was heated at a temperature rising rate of 3° C./minute to 450° C. in a nitrogen atmosphere and kept at this temperature for 5 hours and then heated at a temperature rising rate of 5° C./minute to 1350° C. and kept at this temperature for 10 hours to obtain a ceramic sintered body. After this sintered body was cooled to room temperature, it was divided into two halves and the state of the sheets of being just located near the 50th layer, was observed with an electron microscope, and the presence or absence of delamination between the ceramic layer and the conductive layer was observed, and an adhesive property was evaluated according to the following criteria.
○: no delamination was found
x: delamination was found As shown in Table 2, it is found that in the conductive paste prepared in Experimental Example 6 in which previously used ethyl cellulose was used as a binder resin, the coating property, the peel-off property and the shape retaining property are excellent but the adhesive property is low, and in the conductive paste prepared in Experimental Example 5 in which polyvinyl butyral resin was used as a binder resin, the adhesive property is high but the coating property, the peel-off property and the shape retaining property are all poor.

On the other hand, in the conductive paste prepared in Experimental Example 1, 2, 3 or 4 in which modified polyvinyl acetal was used as a binder resin, the adhesive property is high and in addition, in the conductive paste prepared in Experimental Example 3, the coating property is excellent, and in the conductive paste prepared in Experimental Example 4, the peel-off property is excellent, and further in the conductive paste prepared in Experimental Examples 1 and 2, the coating property, the peel-off property and the shape retaining property are all excellent.

INDUSTRIAL APPLICABILITY OF THE INVENTION

In accordance with the present invention, it is possible to provide a binder resin for coating paste, comprising a polyvinyl acetal type resin, having an excellent dispersibility of inorganic powder such as conductive powder, ceramic powder and glass powder and being capable of exerting an extremely excellent coating property, particularly a printing property, when dispersing the inorganic powder to form paste, conductive paste, ceramic paste and glass paste.

The invention claimed is:
1. Conductive paste being capable of exerting an extremely excellent printing property,
which comprises
a) a modified polyvinyl acetal resin comprising structural units represented by the following general formulas (1), (2), (3) and (4):

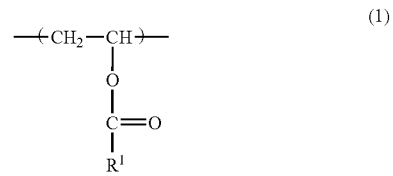

TABLE 2

| | Evaluation of coating property | | Evaluation of peel-off property | | Evaluation of shape retaining property | | Evaluation of |
|---|---|---|---|---|---|---|---|
| | η$_{60}$/η$_{600}$ | evaluation | phase angle (°) | evaluation | η$_{600→60}$/η$_{600}$ | evaluation | adhesive property |
| Experimental Example1 | 2.80 | ○ | 88.1 | ○ | 2.59 | ○ | ○ |
| Experimental Example2 | 2.46 | ○ | 87.7 | ○ | 2.59 | ○ | ○ |
| Experimental Example3 | 2.85 | ○ | 86.6 | x | 1.89 | x | ○ |
| Experimental Example4 | 1.90 | x | 88.9 | ○ | 1.86 | x | ○ |
| Experimental Example5 | 1.95 | x | 86.8 | x | 1.85 | x | ○ |
| Experimental Example6 | 2.78 | ○ | 90.0 | ○ | 2.61 | ○ | x |

-continued

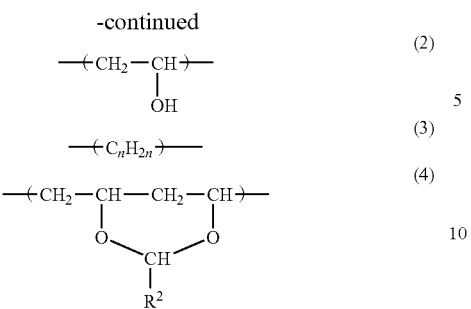

in the formulas, $R^1$ represents a straight chain or branched alkyl group having 1 to 20 carbon atoms, and $R^2$ represents hydrogen, a straight chain, branched or cyclic alkyl group having 1 to 20 carbon atoms, or an aryl group; and n represents an integer of 1 to 8; and further in the modified polyvinyl acetal resin, a content of the structural unit represented by the general formula (3) is 1 to 20 mol % and a content of the structural unit represented by the general formula (4) is 30 to 78 mol %;

(b) conductive powder; and (c) an organic solvent.

2. Ceramic paste being capable of exerting an extremely excellent printing property, which comprises (a) a modified polyvinyl acetal resin comprising structural units represented by the following general formulas (1), (2), (3) and (4):

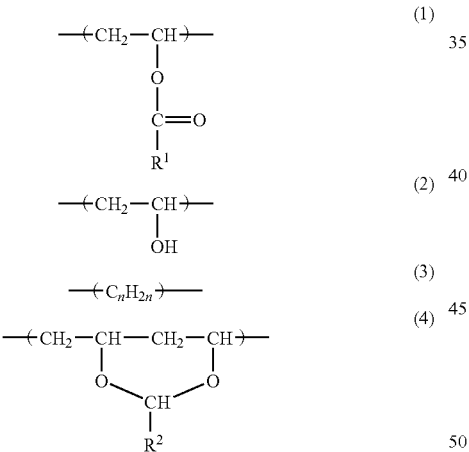

in the formulas, $R^1$ represents a straight chain or branched alkyl group having 1 to 20 carbon atoms, and $R^2$ represents hydrogen, a straight chain, branched or cyclic alkyl group having 1 to 20 carbon atoms, or an aryl group; and n represents an integer of 1 to 8; and further in the modified polyvinyl acetal resin, a content of the structural unit represented by the general formula (3) is 1 to 20 mol % and a content of the structural unit represented by the general formula (4) is 30 to 78 mol %;

(b) ceramic powder; and (c) an organic solvent.

3. Glass paste being capable of exerting an extremely excellent printing property, which comprises (a) a modified polyvinyl acetal resin comprising structural units represented by the following general formulas (1), (2), (3) and (4):

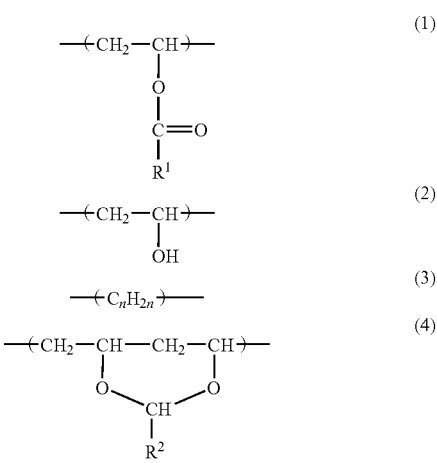

in the formulas, $R^1$ represents a straight chain or branched alkyl group having 1 to 20 carbon atoms, and $R^2$ represents hydrogen, a straight chain, branched or cyclic alkyl group having 1 to 20 carbon atoms, or an aryl group; and n represents an integer of 1 to 8; and further in the modified polyvinyl acetal resin, a content of the structural unit represented by the general formula (3) is 1 to 20 mol % and a content of the structural unit represented by the general formula (4) is 30 to 78 mol %;

(b) glass powder; and (c) an organic solvent.

* * * * *